United States Patent
Li et al.

(10) Patent No.: US 11,653,223 B2
(45) Date of Patent: May 16, 2023

(54) VARIABLE ANTENNA PATTERNS

(71) Applicant: Hewlett Packard Enterprise Development LP, Houston, TX (US)

(72) Inventors: Kuanyue Li, Beijing (CN); Jianpo Han, Beijing (CN); Yuying Chen, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 104 days.

(21) Appl. No.: 17/146,000

(22) Filed: Jan. 11, 2021

(65) Prior Publication Data
US 2022/0225116 A1 Jul. 14, 2022

(51) Int. Cl.
*H04W 16/28* (2009.01)
*H04B 7/0452* (2017.01)
*H04W 84/12* (2009.01)
*H04W 88/08* (2009.01)

(52) U.S. Cl.
CPC .......... *H04W 16/28* (2013.01); *H04B 7/0452* (2013.01); *H04W 84/12* (2013.01); *H04W 88/08* (2013.01)

(58) Field of Classification Search
CPC ..... H04W 16/28; H04W 84/12; H04W 88/08; H04B 7/0452
See application file for complete search history.

(56) References Cited

U.S. PATENT DOCUMENTS

| | | | |
|---|---|---|---|
| 2019/0089426 A1* | 3/2019 | Liu | H04B 7/0417 |
| 2019/0150004 A1* | 5/2019 | Buel | H04B 7/0695 |
| | | | 370/310 |
| 2019/0199423 A1* | 6/2019 | Khoury | H04B 7/0695 |
| 2020/0280997 A1* | 9/2020 | Xiao | H04W 72/082 |
| 2020/0396035 A1* | 12/2020 | Yu | H04L 5/0023 |

OTHER PUBLICATIONS

Eric Johnson, "Wave 2: Antennas in the spotlight", Aruba, available online at <https://blogs.arubanetworks.com/solutions/wave-2-antennas-in-the-spotlight/ >, Feb. 19, 2015, 5 pages.

* cited by examiner

*Primary Examiner* — Abdullahi Ahmed
(74) *Attorney, Agent, or Firm* — Hewlett Packard Enterprise Patent Department

(57) ABSTRACT

Embodiments of the present disclosure relate to variable antenna patterns. A method comprises determining respective locations of a plurality of candidate client stations to be communicated with an access point (AP); assigning the plurality of candidate client stations to at least one of a plurality of predetermined station groups based on the determined respective locations, the plurality of station groups being associated with a plurality of antenna patterns supported by the AP, respectively, and the plurality of antenna patterns providing respective radiation coverage areas; in accordance with a determination that at least one target client station is selected from the plurality of candidate client stations for communication, determining a target antenna pattern associated with a target station group to which the at least one target client station is assigned; and causing the AP to communicate with the at least one target client station using the target antenna pattern.

14 Claims, 12 Drawing Sheets

VARIABLE ANTENNA PATTERNS

BACKGROUND

A wireless local area network (WLAN) uses radio waves rather than wires to communicate between nodes according to corresponding communication technologies (such as Wi-Fi technologies). An access point (AP) is a hardware device that acts as a communication hub for users of a wireless device to connect to the network. Wireless users are also known as client stations. Example client stations are personal computers or phones operating with a wireless network card. An AP includes an antenna assembly that is configured to generate a corresponding antenna pattern for sending radio frequency signals to the client stations. The antenna assembly of the AP is also responsible for receiving radio frequency signals transmitted from each client station.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where.

DETAILED DESCRIPTION

Wireless communication networks are typically placed under great demands to provide high data capacity and signal quality. Currently, some communication techniques are proposed for an access point (AP) to simultaneously communicate with more than one client station. Such communication techniques include Multiple-User (MU) Multiple Input Multiple Output (MU-MIMO), Orthogonal Frequency Division Multiplexing (OFDM), and the like.

Figure 1:
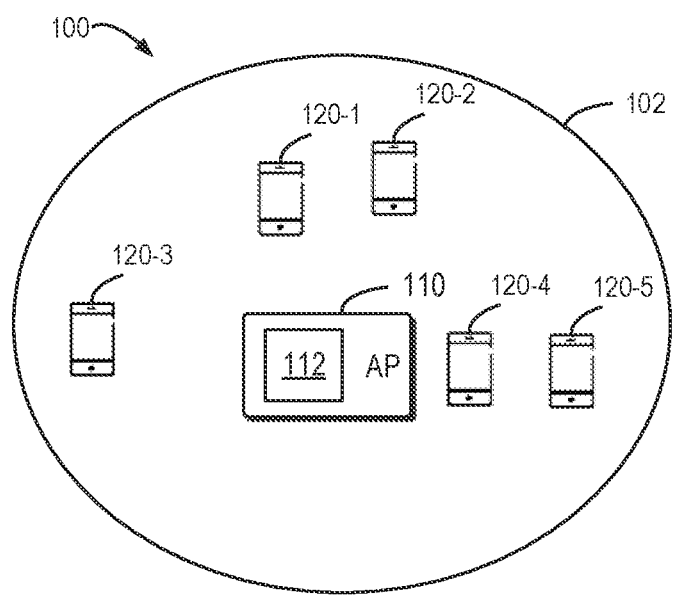
FIG. 1 illustrates a block diagram of an example communication environment in which example embodiments of the present disclosure can be implemented.

FIG. 1 illustrates a block diagram of an example communication environment 100 in which example embodiments of the present disclosure can be implemented. In the environment 100, an AP 110 is configured to serve one or more client stations within its wireless coverage area 102, such as client stations 120-1, 120-2, 120-3, 120-4, and 120-5 as illustrated. For ease of discussion, the client stations 120-1, 120-2, 120-3, 120-4, and 120-5 are collectively or individually referred to as client stations 120.

It is to be understood that the number of devices is only for the purpose of illustration without suggesting any limitations. The environment 100 may include any suitable number of devices adapted for implementing embodiments of the present disclosure. Although not shown, it would be appreciated that one or more additional or less client stations may be located in the coverage area 102, and one or more additional APs may be deployed in the environment 100.

In some example embodiments, the AP 110 may comprise, be implemented as, or known as a Radio Router, Radio Transceiver, switch, Wi-Fi hotspot device, base station, Basic Service Set (BSS), Extended Service Set (ESS), Radio Base Station (RBS), or some other terminology. In some example embodiments, the client station 120 may comprise, be implemented as, or known as an access terminal, subscriber station/module, client device, user equipment (UE), mobile device, mobile station, subscriber station, remote station, mobile terminal, terminal, user terminal, or some other terminology.

The communication in the environment 100 may follow the wireless communication protocols Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, 802.11ax, etc.), or other standards, protocols, or technologies. The frequency bands used for wireless communication channels may be defined for the purpose of this disclosure as they are understood in light of the standards of Wi-Fi, WiGig, any one or more IEEE 802.11 protocols, and/or other applicable standards or protocols. Example frequency bands include 2.4 gigahertz (GHz), 5 GHz, 5.5 GHz, 60 GHz, etc.

The AP 110 is equipped with an antenna assembly 112 to facilitate communication with one or more client stations 120 and one or more other devices (such as other APs). The client stations 120 may also be equipped with respective antenna assemblies (not shown) to facilitate communication with the AP 110 and one or more other devices (such as other client stations or APs). The antenna assembly 112 may comprise one or more antenna elements. An "antenna element" means all or part of an antenna for transmitting or receiving on a single polarization.

Equipping with multiple antenna elements may allow the AP 110 to simultaneously communicate with more than one client station, which can improve the data throughput significantly. In some example embodiments, the AP 110 may perform MU-MIMO communication with multiple client stations 120 using different antenna beams. In some example embodiments, the AP may perform OFDM-based communication by putting a plurality of client stations in a same time slot to a specific antenna direction of the AP 110. In some cases, the AP 110 may also perform single-user (SU) communication with a single client station 120 through beamforming or without beamforming. The SU communication with beamforming may be called as SU-TxBF.

In many applications, to support the capability of transmitting data to multiple client stations at the same time, the antenna assembly of an AP may be designed such that all the antenna elements are able to radiate to all the client stations served by the AP. In operation, the AP may control its antenna assembly to have peak multiple particular beams directed to the targeted client stations and null out the other beams. As such, the antenna pattern of the antenna assembly is designed to be horizontally omnidirectional and such antenna pattern is immutable.

The challenge is that the total number of client stations that need to be served can be much larger than the number of transmit antenna elements at the AP. For MU-MIMO communication, the allowed number of client stations per MU group that the AP can serve simultaneously is equal to or less than the number of transmit antenna elements. In a loaded communication network, the allowed number of client station per MU group is generally less than the total number of client stations served in the network. Thus, selecting the client station group using MU transmission or SU transmission along with scheduling all these client stations over successive time slots is important for achieving high system throughput while guaranteeing user fairness.

However, as the antenna pattern is invariable (omnidirectional), the antenna gain is substantially fixed. Although the AP can perform beamforming to individual client stations, the maximum gain obtained by the beamforming is still limited by the antenna pattern designed for the AP. In addition, due to the limited antenna gain, the signal strength from the AP to the distanced client stations may not be high enough for a high-level modulation coding scheme (MCS) (which may allow for a higher data rate).

Various example embodiments of the present disclosure propose a variable antenna pattern system which allows dynamically adjusting an antenna pattern of an AP to fit to different client stations based on their locations. The example embodiments of the present disclosure will be discussed in detail below with reference to other figures.

Figure 2:
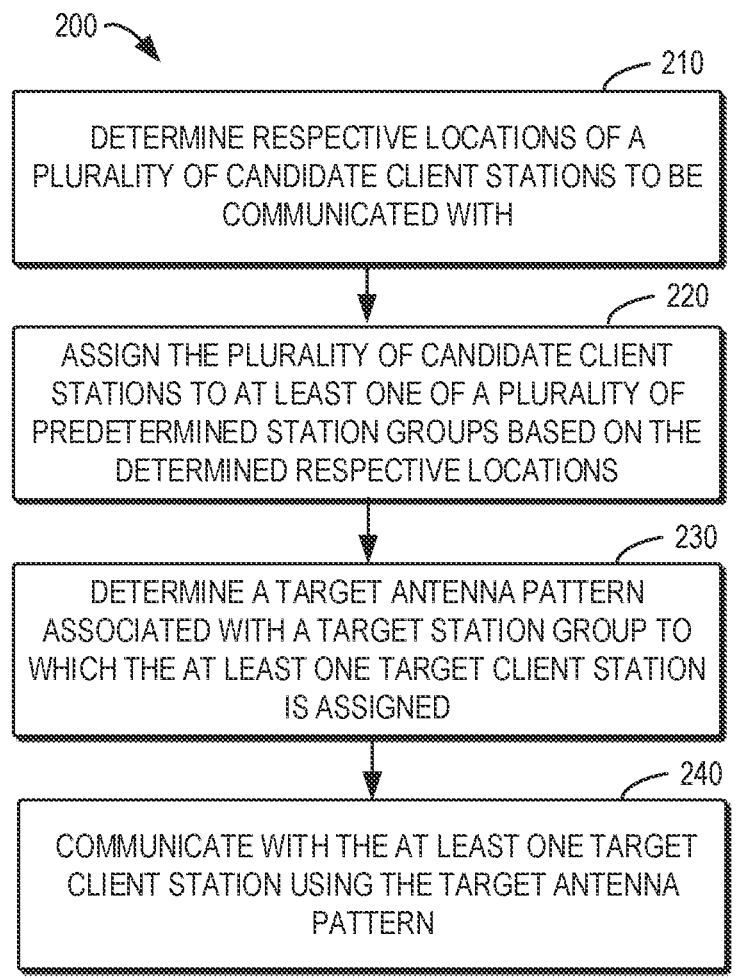
FIG. 2 illustrates a flowchart of a process in accordance with some example embodiments of the present disclosure.

FIG. 2 illustrates a flowchart of a process 200 in accordance with some example embodiments of the present disclosure. The process 200 can be implemented at the AP 110 or by a control device/system that is configured to control the operations of the AP 110. For the purpose of discussion, the process 200 will be described from the perspective of the AP 110 and with reference to FIG. 1.

At 210, the AP 110 determines respective locations of a plurality of candidate client stations to be communicated with the AP 110. The candidate client stations may be client stations 120 to which the AP 110 has data to be transmitted in the environment 100. In the following the candidate client stations are referred to as candidate client stations 120 for the purpose of discussion.

In some example embodiments, the AP 110 may receive, from the candidate client stations 120, information indicating their respective locations. In some example embodiments, the AP 110 may receive the information indicating the respective locations of the candidate client stations 120 from other devices.

At 220, the AP 110 assigns the plurality of candidate client stations 120 to at least one of a plurality of predetermined station groups based on the determined respective locations. The plurality of station groups are associated with a plurality of controllable antenna patterns supported by the AP 110, respectively. Those antenna patterns provide respective radiation coverage areas. In the embodiments of the present disclosure, the AP 110 is capable of controlling its antenna assembly 112 to generate more than one antenna pattern as needed. During communication, the AP 110 can select one of the plurality of antenna patterns for use depending on one or more target client stations with which the AP 110 is to transmit data.

In some example embodiments, the plurality of antenna patterns comprise an omnidirectional antenna pattern and one or more directional antenna patterns. As a result, instead of using an invariable omnidirectional antenna pattern, the AP 110 is allowed to switch among the omnidirectional antenna pattern and the directional antenna patterns. The gain of the omnidirectional antenna pattern is flat in all directions, allowing for simultaneous communication with multiple client stations located in all the directions. A directional antenna pattern may have peak gains in certain directions but the gain in some other directions will shrink.

Allowing the AP 110 to switch from an omnidirectional antenna pattern to a directional antenna pattern can achieve gain increase in different communication scenarios and thus improve the system throughput. Generally, with the same transmit (Tx) power used, the peak gains achieved by the directional antenna pattern may be higher than the flat gain of the omnidirectional antenna pattern. Thus, by using a directional antenna pattern, the client stations located in the directions with the peak gains may achieve extra gain increase. In some communication scenarios, if the AP 110 performs MU-MIMO communication, the maximum gain for individual client stations may increase by 3 dB or more in the same communication condition, and the throughput can also be improved because a high-level of MCS may be used.

With the increased gain provided by the antenna assembly, it is possible to meet the sensitivity requirement for a higher level of MCS specified in certain communication standards. In the following, Table 1 shows example sensitivity requirements (in dBm) for different MCS in 802.11ax HE (high efficiency) standards. Under the same Tx power and signal-noise rate (SNR), if the sensitivity requirement changes from −83 dBm to −81 dBm, the MCS used may be changed from MCS1 to MCS2. The higher level of MCS (usually indicated by a larger MCS index) may allow a higher data rate for a data stream. For example, Table 2 shows example data rates in different MCSs in 802.11 standards. As can be seen, the higher the MCS index, the higher the data rate can be achieved. As a result, the data throughput may also be improved.

TABLE 1

Sensitivity requirements (in dBm) for different MCS in 802.11ax HE

|  | MCS Index | Tx Power | SNR | Sensitivity |
|---|---|---|---|---|
| 802.11ax HE80 | MCS0 | 22 | −13 | −86 |
|  | MCS1 | 22 | −13 | −83 |
|  | MCS2 | 22 | −13 | −81 |
|  | MCS3 | 22 | −16 | −78 |
|  | MCS4 | 22 | −19 | −74 |
|  | MCS5 | 21 | −22 | −70 |
|  | MCS6 | 20 | −25 | −69 |
|  | MCS7 | 20 | −28 | −69 |
|  | MCS8 | 19 | −30 | −65 |
|  | MCS9 | 19 | −32 | −62 |
|  | MCS10 | 17 | −35 | −58 |
|  | MCS11 | 17 | −35 | −56 |

TABLE 2

Example data rates in different MCSs

| | | | Data rate (in Mb/s) | | | | | | |
|---|---|---|---|---|---|---|---|---|---|
| | | | 20 MHz channels | | 40 MHz channels | | 80 MHz channels | | 160 MHz channels | |
| MCS index | Modulation type | Coding rate | 1600 ns GI | 800 ns GI | 1600 ns GI | 800 ns GI | 1600 ns GI | 800 ns GI | 1600 ns GI | 800 ns GI |
|---|---|---|---|---|---|---|---|---|---|---|
| 0 | BPSK | 1/2 | 8 | 8.6 | 16 | 17.2 | 34 | 36 | 68 | 72 |
| 1 | QPSK | 1/2 | 16 | 17.2 | 33 | 34.4 | 68 | 72.1 | 136 | 144 |
| 2 | QPSK | 3/4 | 24 | 25.8 | 49 | 51.6 | 102 | 108.1 | 204 | 216 |
| 3 | 16-QAM | 1/2 | 33 | 34.4 | 65 | 68.8 | 136 | 144.1 | 272 | 282 |
| 4 | 16-QAM | 3/4 | 49 | 51.6 | 98 | 103.2 | 204 | 216.2 | 408 | 432 |
| 5 | 64-QAM | 2/3 | 65 | 68.8 | 130 | 137.6 | 272 | 288.2 | 544 | 576 |
| 6 | 64-QAM | 3/4 | 73 | 77.4 | 146 | 154.9 | 306 | 324.4 | 613 | 649 |
| 7 | 64-QAM | 2/3 | 81 | 86 | 163 | 172.1 | 340 | 360.3 | 681 | 721 |
| 8 | 256-QAM | 3/4 | 98 | 103.2 | 195 | 206.5 | 408 | 432.4 | 817 | 865 |
| 9 | 256-QAM | 5/6 | 108 | 114.7 | 217 | 229.4 | 453 | 480.4 | 907 | 961 |
| 10 | 1024-QAM | 3/4 | 122 | 129 | 244 | 258.1 | 510 | 540.4 | 1021 | 1081 |
| 11 | 1024-QAM | 5/6 | 135 | 143.4 | 271 | 286.8 | 567 | 600.5 | 1134 | 1201 |

Figure 3:
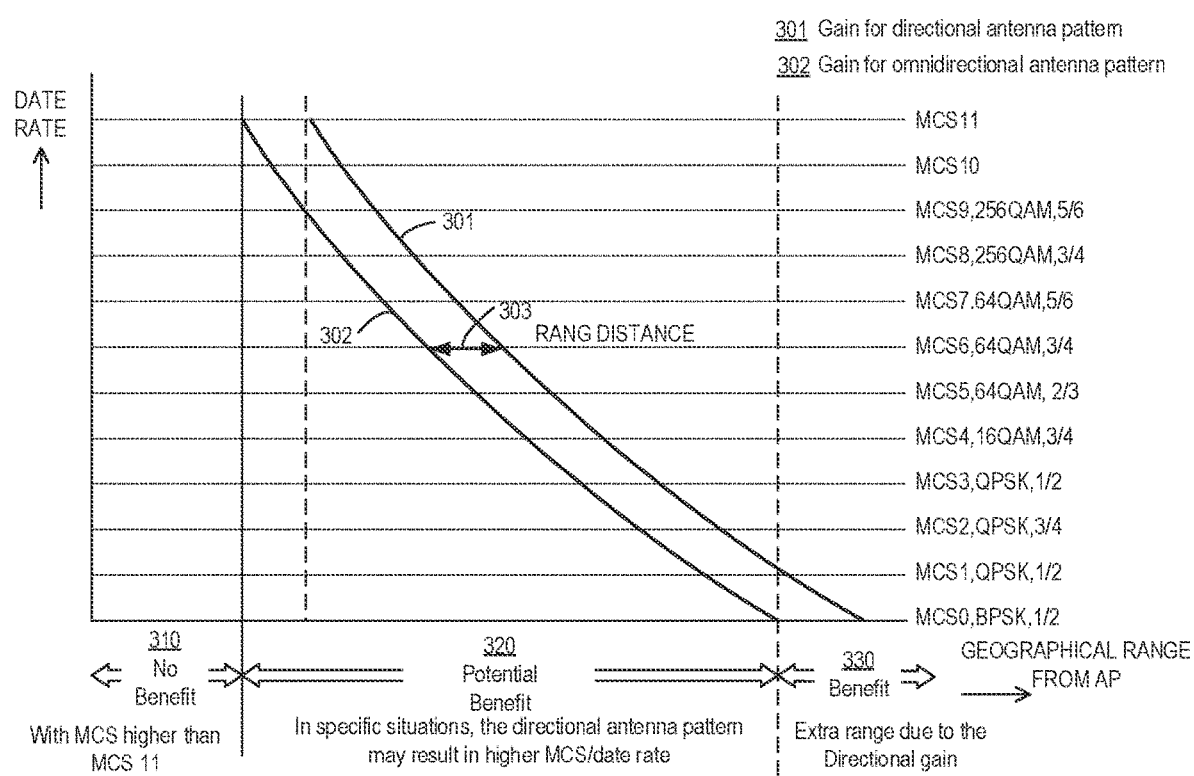
FIG. 3 illustrates a curve diagram showing the relationships between antenna gains and data rates when applying a directional antenna pattern and an omnidirectional antenna pattern respectively in accordance with some example embodiments of the present disclosure.

FIG. 3 illustrates curves 301 and 302 showing the relationships between antenna gains and data rates when applying a directional antenna pattern and an omnidirectional antenna pattern respectively. As can be seen, in a geographical range 310 from the AP, if a MCS higher than MCS11 is applied, there may not be gain benefits for the directional antenna pattern.

In a geographical range 320 from the AP, the AP is allowed to apply higher MCS or data rate in specific situations due to the gain increase provided by the directional antenna pattern. By applying the same data rate and the same MCS, the directional antenna pattern can be used to serve a larger geographical range (as indicated by a range distance 303). In a larger geographical range 330 from the AP, the AP may be able to serve an extra geographical area using the directional antenna pattern but the omnidirectional antenna pattern may provide no antenna gain in that extra geographical area.

As discussed above, the directional antenna patterns can provide gain increase which will be beneficial in many communication scenarios. In addition, the omnidirectional antenna pattern, which provides a flat gain in all directions, can be used to support client stations spread in the coverage area of the AP 110. In the embodiments of the present disclosure, by configuring the AP 110 to switch among the omnidirectional antenna pattern and the omnidirectional antenna pattern, the AP 110 can select a more suitable target antenna pattern for communication with the target client station(s).

Figure 4A:
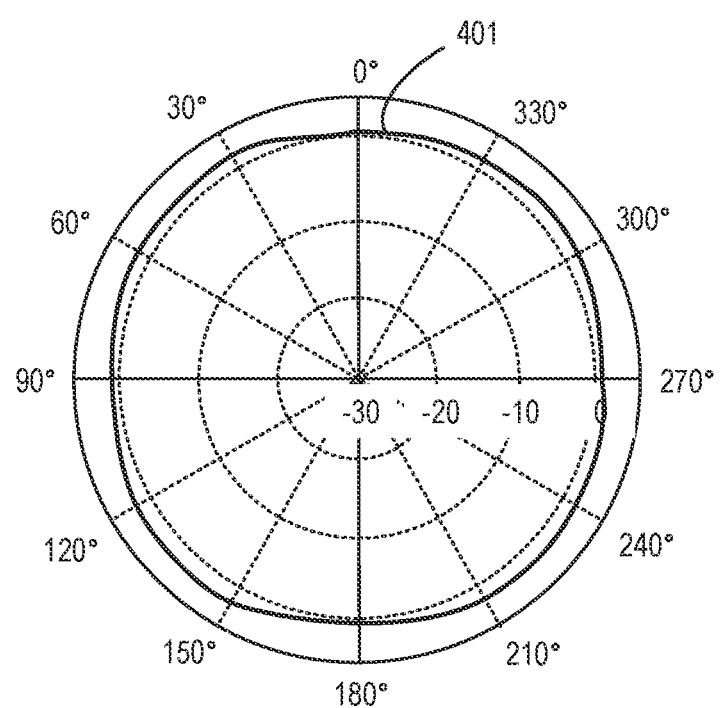
FIGS. 4A-4C illustrate example antenna patterns supported by the AP in accordance with some example embodiments of the present disclosure.
Figure 4B:
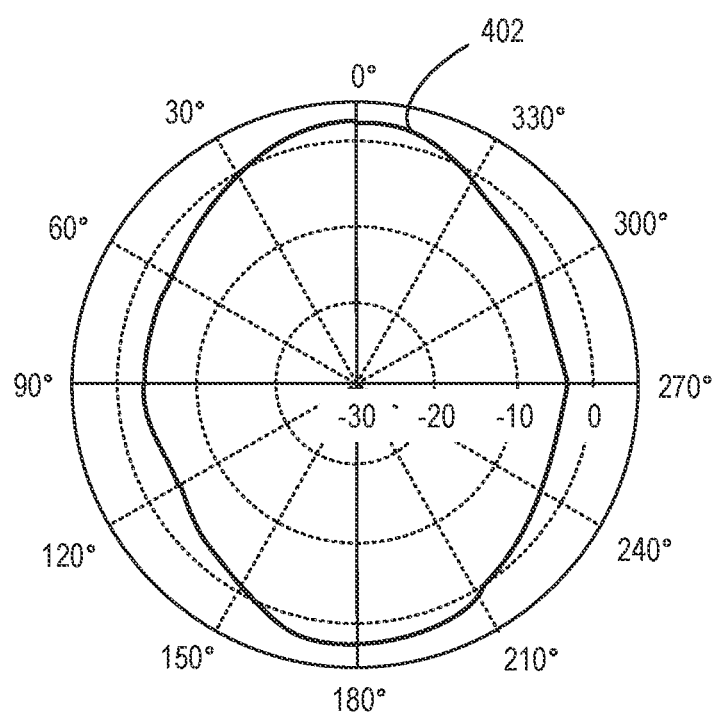
Figure 4C:
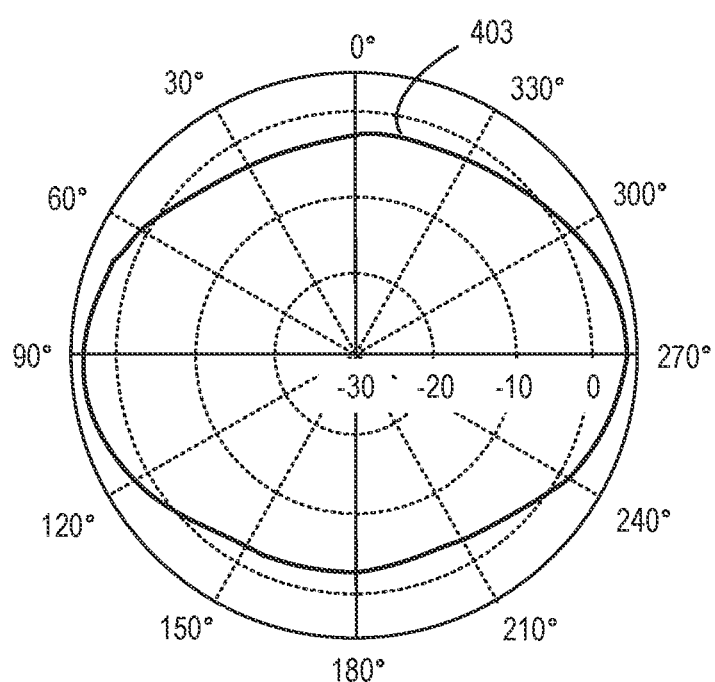

In some example embodiments, among the plurality of antenna patterns, one or more directional antenna patterns may be designed to have peak gains in any directions. FIGS. 4A-4C illustrate example antenna patterns supported by the AP in accordance with some example embodiments of the present disclosure. In FIGS. 4A-4C, antenna patterns in an azimuth plane of the AP 110 are shown, with curves indicating gains (in dBi) of the respective antenna patterns in different degrees in the azimuth plane. In this example, it is assumed that the antenna assembly 112 of the AP 110 is a 2×2 antenna array with two antenna elements, although any other number of antenna elements is also possible.

FIG. 4A illustrates an omnidirectional antenna pattern 401 with gains substantially flat in all directions in the azimuth plane. FIG. 4B illustrates a directional antenna pattern 402 with peak gains at zero degree and 180 degrees in the azimuthal plane. In some examples, with the same Tx power, the directional antenna pattern 402 may obtain an 3 dB or more of gain increase at zero degree and 180 degrees. The gains of the directional antenna pattern 402 at 90 degrees and 270 degrees will shrink. FIG. 4C illustrates a directional antenna pattern 403 with peak gains at 90 degrees and 270 degrees in the azimuthal plane. In some examples, with the same Tx power, the directional antenna pattern 403 may obtain an 3 dB or more of gain increase at 90 degrees and 270 degrees. The gains of the directional antenna pattern 403 at zero degree and 180 degrees will shrink.

Due to the different gains achieved in different directions, the omnidirectional antenna pattern and directional antenna patterns of the AP 110 may cover different radiation coverage areas within which the client stations 120 can be well served. In some example embodiments, the radiation coverage area provided by the omnidirectional antenna pattern may cover partially or all the radiation coverage area(s) of the directional antenna patterns. In some example embodiments, two or more directional antenna patterns may have their radiation coverage areas partially overlapped with each other.

It would be appreciated that the three antenna patterns 401, 402, and 403 in FIGS. 4A-4C are merely some example antenna patterns for the AP 110. In some example embodiments, the AP 110 may support only directional antenna patterns without the omnidirectional antenna patterns if appropriate. In some example embodiments, the AP 110 may be able to generate one or more other different directional antenna patterns with the peak gains in different directions.

For example, a directional antenna pattern may have the peak gains in 30 degrees and 210 degrees in the azimuthal plane, another directional antenna pattern may have the peak gains in 60 degrees and 300 degrees, a directional pattern may have one peak gain in 90 degrees, and so on. In some example embodiments, a directional antenna pattern may behave the peak gains in more than two directions, so as to generate more than two peak beams in the corresponding directions. For example, for a 4×4 antenna assembly 112 with four antenna elements to support simultaneous communication with up to 4 client stations, a directional antenna pattern may be configured with peak gains at zero degree, 90 degrees, 180 degrees, and 270 degrees. Other directional antenna patterns with the peak gains in other directions may be possible. As another example, for a 3×3 antenna assembly 112 with three antenna elements, a directional pattern antenna with peak gains at three different directions may be configured for the AP 110. One or more other different directional antenna patterns may also be designed for the antenna assembly 112. The scope of the present disclosure is not limited in this regard, and any directional antenna patterns suitable for the antenna assembly can be applied.

Figure 5A:
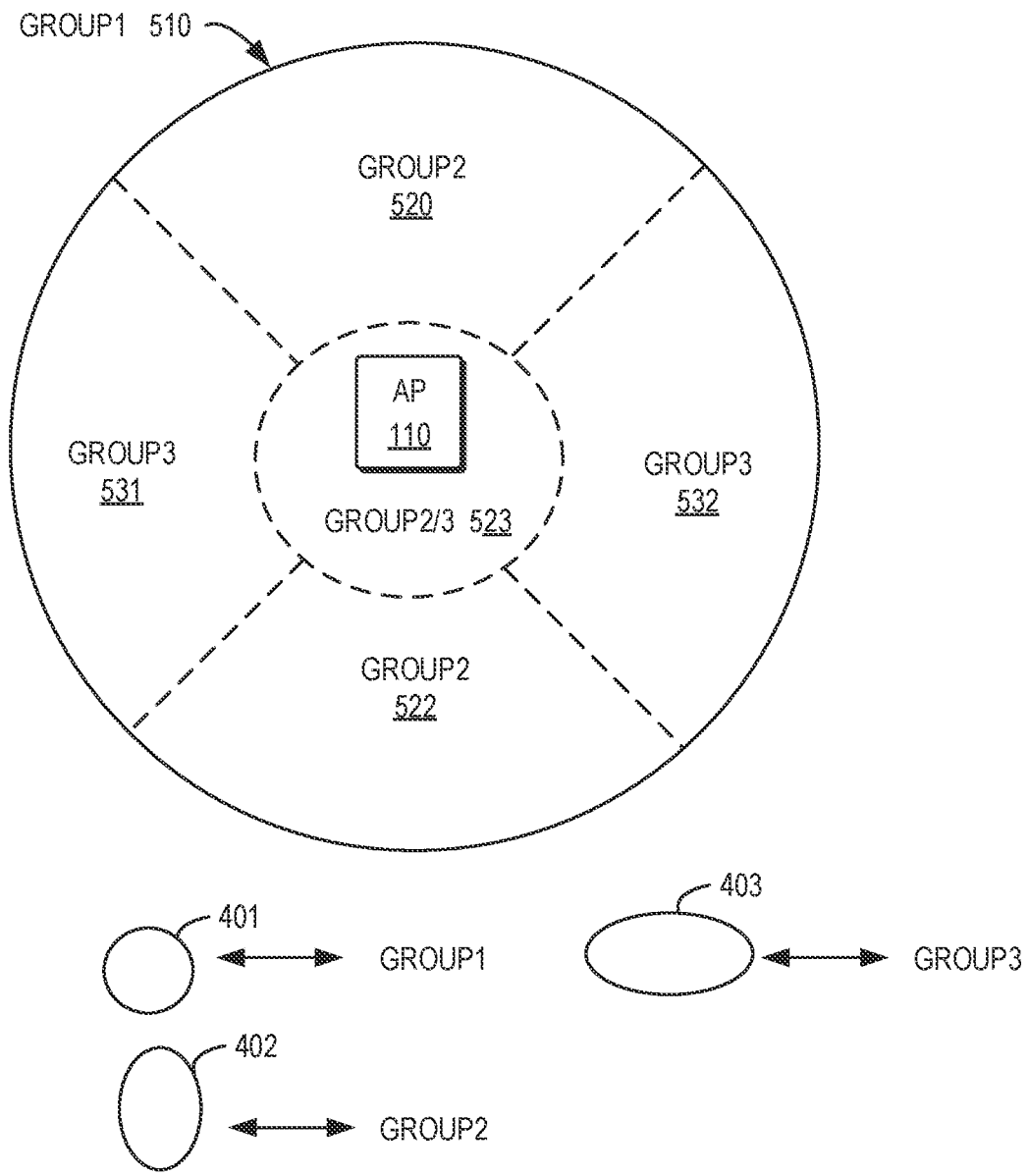
FIG. 5A illustrates radiation coverage areas of respective station groups associated with different antenna patterns in accordance with some example embodiments of the present disclosure.

As the plurality of antenna patterns may cover different radiation coverage areas, the AP 100 may configure an association between the plurality of antenna patterns and a plurality of station groups. The station groups may be divided based on the radiation coverage areas of the plurality of antenna patterns. FIG. 5A illustrates radiation coverage areas of respective station groups associated with different antenna patterns in accordance with some example embodiments of the present disclosure. It is assumed that three station groups are associated with the antenna patterns 401, 402, and 403 in FIGS. 4A-4C, respectively.

As illustrated, with the AP 110 located in the center, a station group (denoted as "Group1") may be associated with the omnidirectional antenna pattern 401 with a radiation coverage area covering the whole area 510. Another station group (denoted as "Group2") may be associated with the directional antenna pattern 402 with a radiation coverage area covering a region 521 having a range from −45 degrees to 45 degrees from the center point of the AP 110, a region 522 having a range from 135 degrees to 225 degrees, and a central region 523. A further station group (denoted as "Group3") may be associated with the directional antenna pattern 403 with a radiation coverage area covering a region 531 having a range from 45 degrees to 135 degrees from the center point of the AP 110, a region 532 having a range from 225 degrees to 315 degrees, and the central region 523.

In the shown example, the radiation coverage area of the omnidirectional antenna patter 401 covers all the radiation coverage areas of the directional antenna patterns 402 and 403. In addition, the directional antenna patterns 402 and 403 covers the same central region 523.

Depending on the locations of the candidate client stations 120 and the radiation coverage areas of the antenna patterns, the AP 110 may be able to assign the candidate client stations 120 to one or more of the predetermined station groups associated with the respective antenna patterns. In some example embodiments, a candidate client station 120 may be assigned into more than one station group depending on its location and the radiation coverage areas provided by the predetermined antenna patterns.

In some example embodiments, the AP 110 may directly assign all the plurality of candidate client stations 120 to a station group associated with the omnidirectional antenna pattern, for example, Group1 associated with the omnidirectional antenna pattern 401 in FIG. 5A. In some example embodiments, if a candidate client station is located within a radiation coverage area provided by a directional antenna pattern, the AP 110 may assign this candidate client station 120 to the station group associated with the directional antenna pattern. In some example embodiments, if the radiation coverage areas of two or more directional antenna patterns are overlapped with each and a candidate client station 120 locates within the overlapped area, the AP 110 may assign this candidate client station 120 to two or more station groups associated with two or more directional antenna patterns.

Figure 5B:
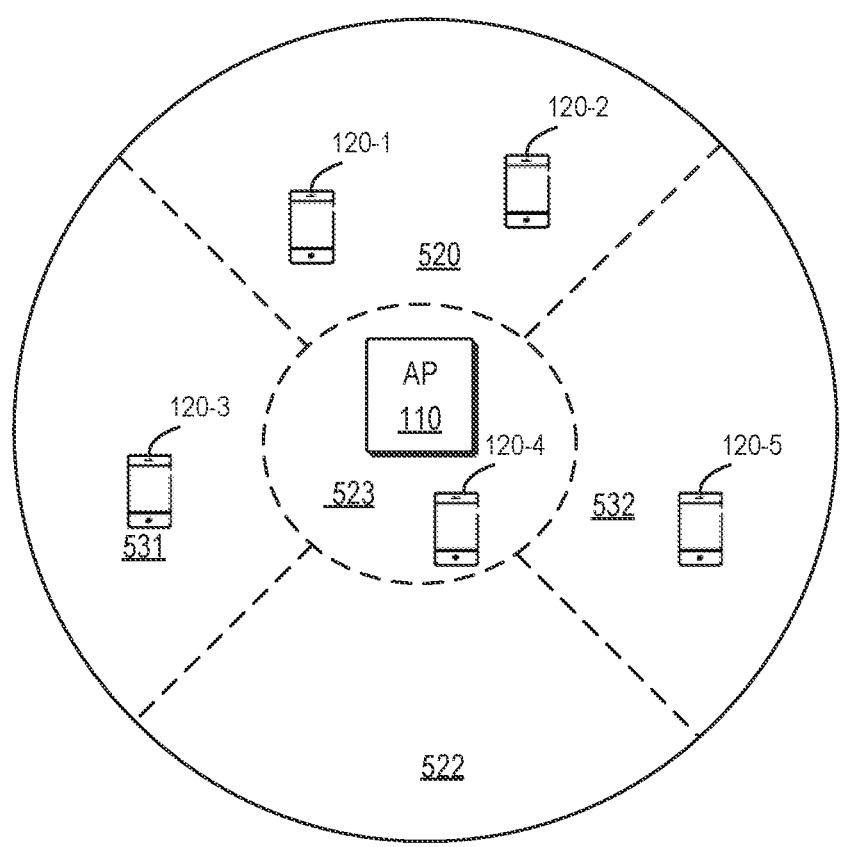
FIG. 5B illustrates location-based grouping of client stations in accordance with some example embodiments of the present disclosure.

FIG. 5B illustrates location-based grouping of client stations 120 in accordance with some example embodiments of the present disclosure. As shown, since candidate client stations 120-1 and 120-3 locates within the region 520 which is covered by the directional antenna pattern 402, the AP 110 may assign the candidate client stations 120-1 and 120-3 to Group2 associated with the directional antenna pattern 401. Since candidate client stations 120-3 and 120-5 locate within the areas 531 and 532 covered by the directional antenna pattern 403, the AP 110 may assign the candidate client stations 120-3 and 120-5 to Group3. The candidate client station 120-4 locates within the central region 523 which is covered by both the directional antenna patterns 402 and 403, then this candidate client station 120-4 may be assigned to both Group2 and Group3. In addition, all the five candidate client stations may be assigned to Group1 which is associated with the omnidirectional antenna pattern 401.

During communication, one or more target client stations can be selected from the plurality of candidate client stations 120 for communication with the AP 110. In some examples, if the AP 110 determines to perform SU-TxBF communication or SU communication without beamforming, then one target client station may be selected. In some examples, if the AP 110 determines to perform multi-user (MU) simultaneous communication with multiple client stations (e.g., MU-MIMO communication or OFDM-based communication), then two or more target client stations may be selected. The selection of the target client station(s) may be based on some criteria that are predefined in the AP 110. In some example embodiments, the respective locations of the candidate client stations 120 may also be used to determine the suitable candidate client stations. Some example embodiments of the selection of the target client station(s) will be described in detail below.

Reference is made back to FIG. 2. If it is determined that at least one target client station is selected from the plurality of candidate client stations for communication, at 230, the AP 110 determines a target antenna pattern associated with a target station group to which the at least one target client station is assigned.

In some example embodiments, if a plurality of target client stations are selected, the target station group may be the one to which all the target client stations are assigned. For example, a target client station may be assigned to two or more station groups associated with different radiation coverage areas, and the same station group shared with all the other client stations may be selected as the target station group.

If the plurality of target client stations are selected to be spread in various directions within the total coverage area 102 of the AP 110, all those target client stations may at least be assigned to a station group associated with the omnidirectional antenna pattern (e.g., Group1 in the example of FIG. 5A). In some example embodiments, if one or more target client stations share two or more station groups, then the station group associated with an antenna pattern having a higher gain at certain directions may be selected. For example, if the shared station groups include a station group associated with the omnidirectional antenna pattern (e.g., Group1 in the example of FIG. 4A) and another station group associated with a directional antenna pattern (e.g., Group2 in the example of FIG. 4A), the station group associated with the directional antenna pattern may be determined as the target station group and thus the associated directional antenna pattern is used as the target antenna pattern. In some example embodiments, if the one or more target client stations share two or more station groups associated with the directional antenna patterns, any of the shared station groups may be selected as the target station group.

In some example embodiments, the antenna assembly 112 of the AP 110 may include one or more antenna elements, and each antenna element may be controlled to generate the plurality of controllable antenna patterns. In the case of equipping with two or more antenna elements, the antenna patterns of all the antenna elements may keep synchronized.

At 240, with the target antenna pattern determined, the AP 110 communicates with the at least one target client station using the target antenna pattern. The switching of the antenna pattern generated by the antenna assembly may be controlled by a control system of the AP 110, for example, by issuing a command from a central process of the AP 110. In some examples, the time for the switching may be in nanoseconds. Depending on the configuration of the AP 110, the time may be around 100 ns.

As mentioned above, one or more target client stations may be selected from the plurality of candidate client stations 120 for communication. The selection of the target client stations may be based on various factors such as the lengths of the data packets to be transmitted to the candidate client stations 120, the date rate, the SNR over the communication links with the candidate client stations 120, the power saving (PS), the priorities of the candidate client stations 120 or the data packets, the fairness among the candidate client stations 120, the space channel status, and the like. For example, in the case of MU-MIMO communication, the AP 110 may determine which client stations form part of a MU-MIMO group which is spatially and polarization multiplexed to share the same time and frequency resource. The target client stations for a MU-MIMO group may be selected on the basis of which combination of group members allows mutually orthogonal beams to be formed with appropriately selected polarization, and on the basis of traffic demands.

Figure 6:
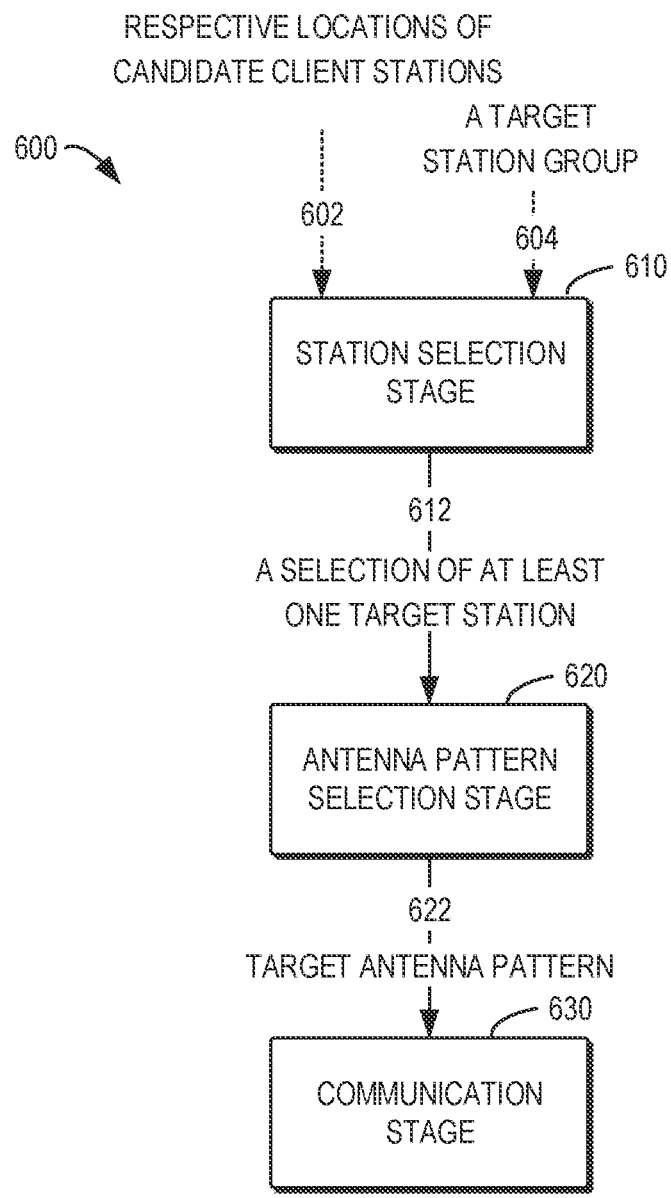
FIG. 6 illustrates a flowchart of a communication process in accordance with some example embodiments of the present disclosure.

In some example embodiments, the locations of the candidate client stations 120 may be considered as one of the factors used for selecting the target client station(s). FIG. 6 illustrates a flowchart of a communication process 600 in accordance with some example embodiments of the present disclosure. The process 600 may be implemented at the AP 110 or by a control device/system that is configured to control the operations of the AP 110. For the purpose of discussion, the process 600 will be described from the perspective of the AP 110 and with reference to FIG. 1.

The AP 110 may perform a station selection stage 610 to select one or more target client stations for communication. In some example embodiments, the AP 110 may also take the respective locations 602 of all the candidate client stations 120 into combination in addition to various other factors that need to be considered in station selections. The locations of all the candidate client stations 120 may be used as a factor to determine which the target client station(s) is selected.

In some example embodiments, after the plurality of candidate client stations 120 are assigned to one or more of the plurality of station groups associated with the antenna patterns, the AP 110 may select a target station group 604 to guide the selection of the target client station(s) at the station selection stage 610. In some example embodiments, all the candidate client stations 120 may be assigned to a total of two or more station groups. For example, in FIG. 5B, all the candidate client stations 120-1 to 120-5 are assigned into a total of three groups (Group1. Group2, and Group3). For each of the station groups, the AP 110 may determine the number of candidate client stations assigned into this station group. In some examples, since all the candidate client stations are assigned in default to the station group associated with the omnidirectional antenna pattern, this station group may be not considered.

The AP 110 may compare the numbers of stations within the two or more station groups with a threshold number and select a station group of the two or more station groups having the number of stations exceeding the threshold number, as the target client station. In the case that the station group associated with the omnidirectional antenna pattern is excluded, the station group associated with a directional antenna pattern and having the majority of candidate client stations 120 may be selected as the target station group 604. In some example embodiments, in selecting the target client station(s), the AP 110 may select at least one target client station assigned to the target station group.

The selection 612 of the at least one target client station may be provided for use in an antenna pattern selection stage 620. In the antenna pattern selection stage 620, the AP 110 may determine a target antenna pattern associated with the target station group. In some example embodiments, if a plurality of target client stations are selected but they are assigned to different station groups associated with different directional antenna patterns, the AP 110 may select the omnidirectional antenna pattern as the target antenna pattern.

After the target antenna pattern 622 is determined, the AP 110 performs a communication stage 630 based on the target antenna pattern 622. At the communication stage 630, the AP 110 can communicate with the at least one target client station using the target antenna pattern.

In some example embodiments, the antenna assembly 112 of the AP 110 may be configured in default to apply the omnidirectional antenna pattern. If the target antenna pattern is determined to be a directional antenna pattern, the AP 110 may control the antenna assembly 112 to switch to the directional antenna pattern. The configuration of the antenna assembly 112 that supports the pattern switching will be discussed in detail below with reference to FIGS. 8-9.

In some example embodiments, if a single target client station is to be communicated and no beamforming is used, the AP 110 may directly transmit data to the target client station using the target antenna pattern. In some example embodiments, if the AP 110 is to communicate with more than one target client station or to perform beamforming for a single target client station, the AP 110 may perform beam training before the data transmission. In the case of more than one target client station is to be communicated, the AP 110 may perform MU-MIMO or OFDM-based communication with the target client stations.

In some example embodiments, to perform the beam training, the AP 110 may perform a NDP sounding process with the target client station(s). In some example embodiments, for the certain target client station(s) selected, the AP 110 may determine whether the NDP sounding process needs to be performed. Specifically, if the last successful NDP sounding process is performed for the same target client station(s) for the same target antenna pattern, the AP 110 may determine that no further NDP sounding process needs to be performed and may communicate data with the target client station(s) directly using the target antenna pattern. In some examples, the AP 110 may further check whether a validity period of time for the last successful NDP sounding process has elapsed. If the successful NDP sounding process is still valid, the AP 110 may communicate data with the target client station(s) using the target antenna pattern. In some examples, if the or if the validity period of time for the last successful NDP sounding process has elapsed, the AP 110 may initiate a further NDP sounding process with the target client station(s) using the target antenna pattern.

In some example embodiments, if no successful NDP sounding process is performed with any of the target client station(s) using the target antenna pattern, the AP 110 may initiate a further NDP sounding process with the target client station(s) using the target antenna pattern. For example, a new target client station may be selected for communication using the target antenna pattern or the last successful NDP sounding process is performed for a different antenna pattern, the AP 110 may initiate a further NDP sounding process.

Figure 7:
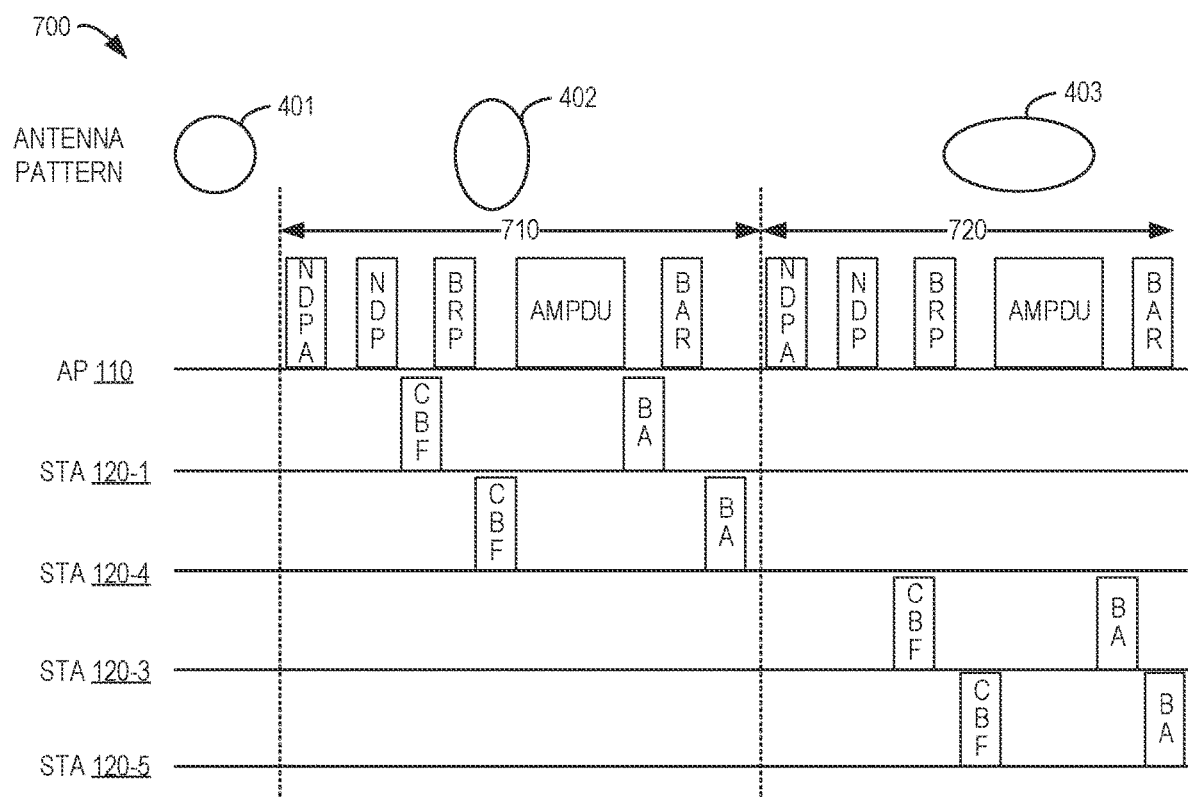
FIG. 7 illustrates a diagram showing a null data packet (NDP) sounding process in accordance with some example embodiments of the present disclosure.

FIG. 7 illustrates a diagram showing an example NDP sounding process 700 in accordance with some example embodiments of the present disclosure. At the beginning, the omnidirectional antenna pattern 401 of FIG. 4A is configured in default for the AP 110.

The AP 110 determines to select client stations ('STA') 120-1 and 120-4 for a MU-MIMO communication and the target antenna pattern is selected as the directional antenna pattern 402 of FIG. 4B. In this case, the AP 110 may initiate a NDP sounding process 710 with client stations 120-1 and 120-4. FIG. 7 illustrates the messages and responses communicated during the NDP sounding process 710. Specifically, the AP 110 may transmit a Null Data Packet Announcement (NDPA) message and then transmit a Null Data Packet (NDP) for the client station 120-1 and 120-4. Upon receipt of the NDP, the client station 120-1 transmits a Compressed Beamforming Frame (CBF). Upon receipt of the CBF, the AP 110 may generate a Beamforming Report Poll (BRP) and transmit it to the client station 120-4 and receive the CBF from the client station 120-4. At this time, the AP 110 may generate and transmit an Aggregate MAC Protocol Data Unit (AMPDU), where MAC stands for Medium Access Control. The client stations 120-1 and 120-4 may each transmit a Block Acknowledgment (BA) to the AP 110, which may feedback with a BA response (BAR). In this way, the NDP sounding process 710 is successfully completed. The AP 110 may transmit data to the client stations 120-1 and 120-4 simultaneously using the antenna pattern 402.

At a later time, if the client stations 120-3 and 120-5 are selected for transmission by using the antenna pattern 403 of FIG. 4C, the AP 110 may determine that a further NDP sounding process 720 may be initiated with the client stations 120-3 and 120-5. The messages and responses transmitted in the NDP sounding process 720 are similar to the NDP sounding process 710.

Figure 8:
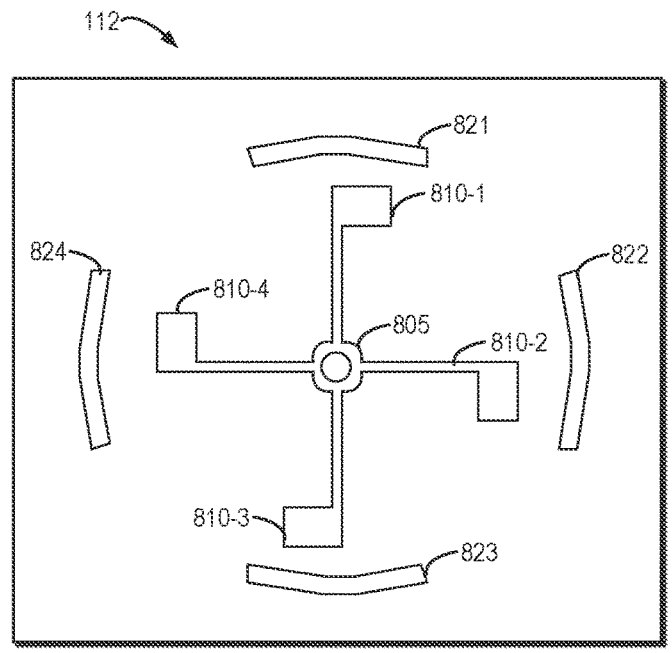
FIG. 8 illustrates a block diagram of an antenna assembly in accordance with some example embodiments of the present disclosure.

In some example embodiments, to support the controllable antenna patterns, the antenna assembly 110 of the AP 110 may include one or more antenna elements and a plurality of reflectors disposed around the antenna elements. FIG. 8 illustrates a block diagram of the antenna assembly 112 in accordance with some example embodiments of the present disclosure. In this example, the antenna assembly 112 is a 2×2 antenna assembly with four antenna elements 810-1, 810-2, 810-3, and 810-4 (collectively or individually referred to as antenna elements 810) and a resonator 805. The antenna assembly 112 also comprises a plurality of reflectors 821, 822, 823, and 824 disposed round the antenna elements 810. The number of the reflectors and their arrangement may depend on the directional antenna pattern(s) to be generated for use by the AP 110. The disabling and enabling of the reflectors 821, 822, 823, and 824 are controlled by a control system of the AP 110.

It would be appreciated that although a 2×2 antenna assembly is illustrated in FIG. 8, the antenna assembly 112 may include more or less antenna elements. In some examples, a single antenna element is possible. It would also be appreciated that the antenna assembly 112 may any other number of reflectors to facilitate the generation of the directional antenna pattern(s) supported by the AP 110.

Figure 9:
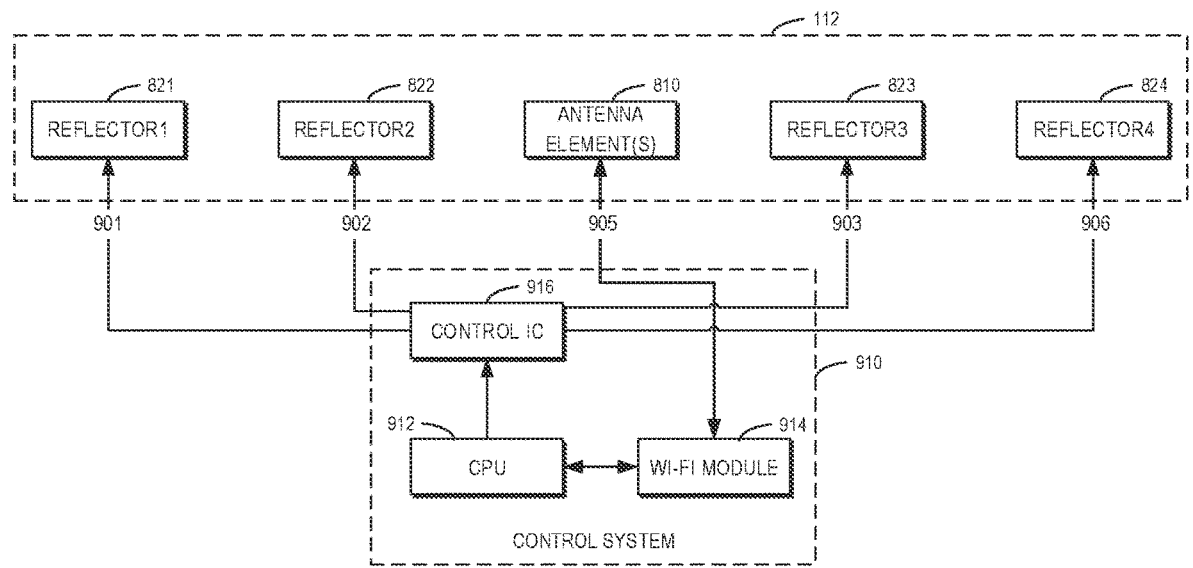
FIG. 9 illustrates a block diagram of an AP in accordance with some example embodiments of the present disclosure.

FIG. 9 illustrates a block diagram of the AP 110 in accordance with some example embodiments of the present disclosure. The AP comprises the antenna assembly 112 (such as the example one shown in FIG. 8) and a control system 910 to control the antenna assembly 112 to generate a target antenna pattern of all the plurality of predetermined antenna patterns.

In the example of FIG. 9, the control system 910 includes a central processing unit (CPU) 912 which executes the process of the present disclosure determine the target antenna pattern to be generated by the antenna assembly 112. The control system 910 includes a control integrated chip (IC) 916. The CPU 912 may control the control IC 916 to issue corresponding commands to control the reflectors 821, 822, 823, and 824 via respective General Purpose Input Output (GPIO) interfaces 901, 902, 903, and 904. The control system 910 further includes a Wi-Fi module 914 which may also be controlled by the CPU 912 to control the antenna element(s) 810 to radiate radio waves. The Wi-Fi module 914 may issue a command(s) to the antenna element(s) 810 via a radio frequency (RF) cable 905.

In some example embodiments, if the target antenna pattern is determined to be the omnidirectional antenna pattern (e.g., the omnidirectional antenna pattern 401), the CPU 912 may control the control IC 916 to disable all the reflectors 821, 822, 823, and 824. In some example embodiments, if the target antenna pattern is a directional antenna pattern, some of the reflectors 821, 822, 823, and 824 may be enabled and the remaining ones may be disabled so as to form the directional antenna pattern. For example, if the target antenna pattern is the directional antenna pattern 402 of FIG. 4B, the reflectors 821 and 823 may be enabled and the reflectors 822 and 824 may be disabled. As another example, if the target antenna pattern is the directional antenna pattern 403 of FIG. 4C, the reflectors 822 and 824 may be enabled and the reflectors 821 and 823 may be disabled. Depending on the directional antenna patterns, the reflectors of the antenna assembly 112 may be disabled or enabled in other ways.

Figure 10:
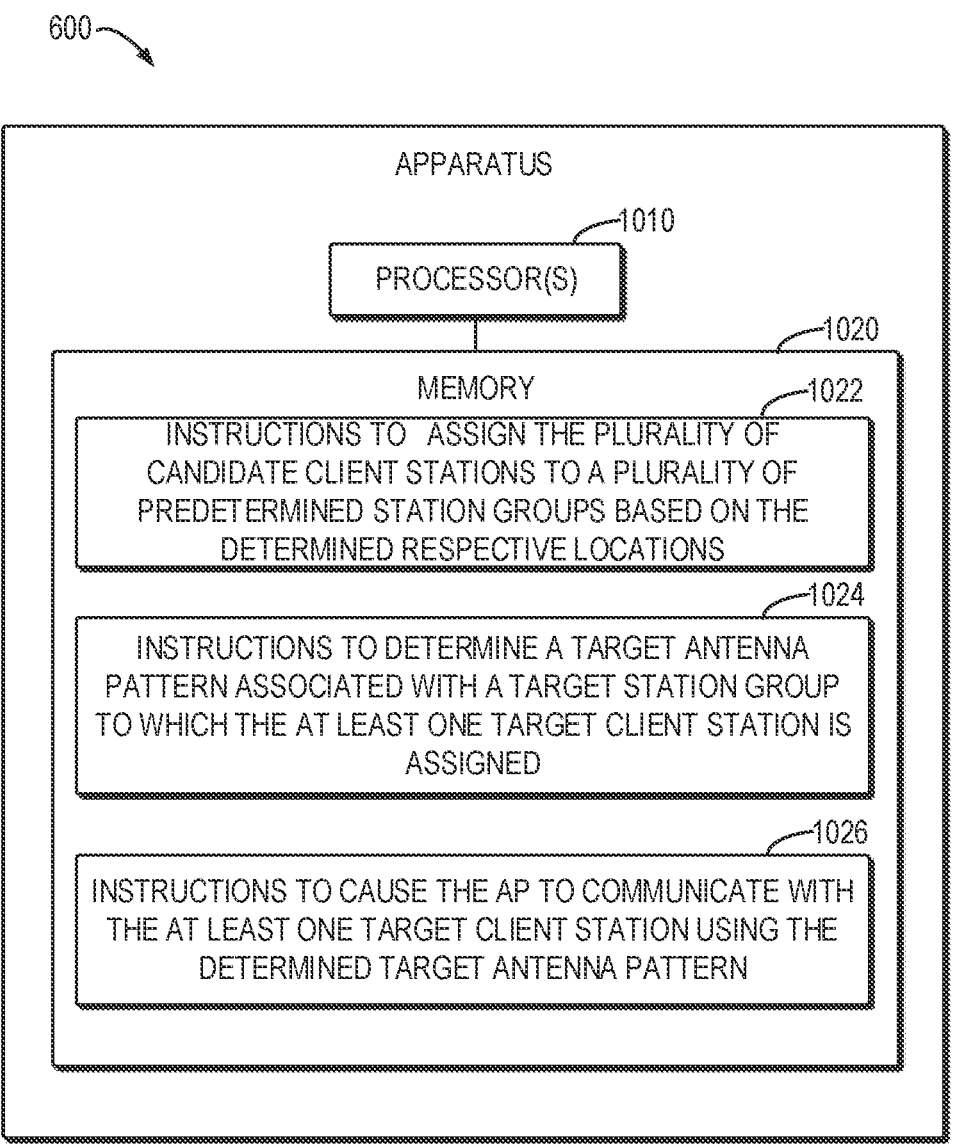
FIG. 10 illustrates a block diagram of an apparatus in accordance with some example embodiments of the present disclosure.

FIG. 10 illustrates a block diagram of an apparatus 1000 in accordance with some example embodiments of the present disclosure. The apparatus 1000 may be implemented as or included in the AP 110 of FIG. 1 or in a control device/system that is configured to control the operations of the AP 110.

The apparatus 1000 comprises at least one processor 1010 and a memory 1020 coupled to the at least one processor 1010. The memory 1020 stores instructions to cause the at least one processor 1010 to implement acts of a method.

As illustrated in FIG. 6, the memory 1020 stores instructions 1022 to assign the plurality of candidate client stations to a plurality of predetermined station groups based on the determined respective locations, the plurality of predetermined station groups being associated with a plurality of antenna patterns of the AR and the plurality of antenna patterns providing respective radiation coverage areas.

The memory 1020 further stores instruction 1024 to, in accordance with a determination that at least one target client station is selected from the plurality of candidate client stations for communication, determine a target antenna pattern associated with a target station group to which the at least one target client station is assigned.

In some example embodiments, the memory 1020 further stores instructions 1026 to cause the AP to communicate with the at least one target client station using the determined target antenna pattern.

In some example embodiments, the plurality of antenna patterns comprise an omnidirectional antenna pattern and at least one directional antenna pattern.

In some example embodiments, assigning the plurality of candidate client stations comprises: assigning the plurality of candidate client stations to a first station group of the plurality of station groups associated with the omnidirectional antenna pattern; and in accordance with a determination that at least one of the plurality of candidate client stations is located within a radiation coverage area provided by one of the at least one directional antenna pattern, assigning the at least one candidate client station to a second station group associated with the directional antenna pattern.

In some example embodiments, the at least one directional antenna pattern comprises a first directional antenna pattern providing a first radiation coverage area and a second directional antenna pattern providing a second radiation coverage area, the first radiation coverage area being partially overlapped with the second radiation coverage area. In some example embodiments, assigning the plurality of candidate client stations further comprises: in accordance with a determination that at least one of the plurality of candidate client stations is located within an overlapped area of the first and the second radiation coverage areas, assigning the at least one candidate client station to both station groups associated with the first directional antenna pattern and the second directional antenna pattern.

In some example embodiments, the first directional antenna pattern has peak gains at zero degree and 180 degrees in an azimuthal plane of the AP, and the second directional antenna pattern has peak gains at 90 degrees and 270 degrees in the azimuthal plane of the AP.

In some example embodiments, the plurality of candidate client stations are assigned to two or more of the plurality of predetermined station groups, the method further comprising: determining a target station group from the two or more station groups based on two or more respective numbers of stations within the two or more station groups; and selecting at least one target client station assigned to the target station group.

In some example embodiments, determining the target station group comprises: comparing the two or more respective numbers of stations within the two or more station groups with a threshold number; and selecting a station group of the two or more station groups having the number of stations exceeding the threshold number, as the target client station.

In some example embodiments, the AP is configured to perform beamforming-based communication or multi-user (MU) multiple-input multiple-output (MU-MIMO) communication with the at least one target client station, and wherein causing the AP to communicate with the at least one target client station comprises: determining whether a successful null data packet (NDP) sounding process for the at least one target client station is performed using the target antenna pattern; in accordance with a determination that the successful NDP sounding process is performed using the target antenna pattern, causing the AP to communicate data with the at least one target client station using the target antenna pattern; and in accordance with a determination that no successful NDP sounding process is performed with any of the at least one target client station using the target antenna pattern, causing the AP to initiate a further NDP sound process with the at least one target client station using the target antenna pattern.

The present disclosure also provides at least one computer program product tangibly stored on a non-transitory computer-readable storage medium. The computer program product includes program codes or instructions which can be executed to carry out the method as described above with reference to FIG. 2.

While the above discussion used a Wi-Fi communication standard as an illustrative example, in other embodiments a wide variety of communication standards and, more generally, wireless communication technologies may be used. Furthermore, while some of the operations in the foregoing embodiments were implemented in hardware or software, in general the operations in the preceding embodiments can be implemented in a wide variety of configurations and architectures. Therefore, some or all of the operations in the foregoing embodiments may be performed in hardware, in software or both.

It should be noted that specific terms disclosed in the present disclosure are proposed for convenience of description and better understanding of example embodiments of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   determining respective locations of a plurality of candidate client stations to be communicated with an access point (AP);
   assigning the plurality of candidate client stations to at least one of a plurality of predetermined station groups based on the determined respective locations, the plurality of station groups being associated with a plurality of antenna patterns supported by the AP, respectively, and the plurality of antenna patterns providing respective radiation coverage areas, wherein the plurality of antenna patterns comprise an omnidirectional antenna pattern and at least one directional antenna pattern;
   wherein assigning the plurality of candidate client stations comprises:
      assigning the plurality of candidate client stations to a first station group of the plurality of station groups associated with the omnidirectional antenna pattern;
      in accordance with a determination that at least one of the plurality of candidate client stations is located within a radiation coverage area provided by one of the at least one directional antenna pattern, assigning the at least one candidate client station to a second station group associated with the directional antenna pattern;
   in accordance with a determination that at least one target client station is selected from the plurality of candidate client stations for communication, determining a target antenna pattern associated with a target station group to which the at least one target client station is assigned; and
   causing the AP to communicate with the at least one target client station using the target antenna pattern.

2. The method of claim 1, wherein the at least one directional antenna pattern comprises a first directional antenna pattern providing a first radiation coverage area and a second directional antenna pattern providing a second radiation coverage area, the first radiation coverage area being partially overlapped with the second radiation coverage area, and
   wherein assigning the plurality of candidate client stations further comprises:
      in accordance with a determination that at least one of the plurality of candidate client stations is located within an overlapped area of the first and the second radiation coverage areas, assigning the at least one candidate client station to both station groups associated with the first directional antenna pattern and the second directional antenna pattern.

3. The method of claim 2, wherein the first directional antenna pattern has peak gains at zero degree and 180 degrees in an azimuthal plane of the AP, and the second directional antenna pattern has peak gains at 90 degrees and 270 degrees in the azimuthal plane of the AP.

4. The method of claim 1, wherein the plurality of candidate client stations are assigned to two or more of the plurality of station groups, the method further comprising:
   determining a target station group from the two or more station groups based on two or more respective numbers of stations within the two or more station groups; and
   selecting at least one target client station assigned to the target station group.

5. The method of claim 4, wherein determining the target station group comprises:
   comparing the two or more respective numbers of stations within the two or more station groups with a threshold number; and
   selecting a station group of the two or more station groups having the number of stations exceeding the threshold number, as the target client station.

6. The method of claim 1, wherein the AP is configured to perform beamforming-based communication or multi-user (MU) multiple-input multiple-output (MU-MIMO) communication with the at least one target client station, and wherein causing the AP to communicate with the at least one target client station comprises:
   determining whether a successful null data packet (NDP) sounding process for the at least one target client station is performed using the target antenna pattern;
   in accordance with a determination that the successful NDP sounding process is performed using the target antenna pattern, causing the AP to communicate data with the at least one target client station using the target antenna pattern; and
   in accordance with a determination that no successful NDP sounding process is performed with any of the at least one target client station using the target antenna pattern, causing the AP to initiate a further NDP sound process with the at least one target client station using the target antenna pattern.

7. An access point (AP) comprising:
   a control system; and
   an antenna assembly operable to generate a plurality of antenna patterns with different radiation coverage areas;
   wherein the control system is configured to:
      assign a plurality of candidate client stations to at least one of a plurality of predetermined station groups based on respective locations of the plurality of candidate client stations, the plurality of predetermined station groups being associated with a plurality of antenna patterns of the AP, and the plurality of antenna patterns providing respective radiation coverage areas, wherein the plurality of antenna patterns comprise an omnidirectional antenna pattern and at least one directional antenna pattern;
   wherein the control system is configured to assign the plurality of candidate client stations by:
      assigning the plurality of candidate client stations to a first station group of the plurality of station groups associated with the omnidirectional antenna pattern;
      in accordance with a determination that at least one of the plurality of candidate client stations is located within a radiation coverage area provided by one of the at least one directional antenna pattern, assigning the at least one candidate client station to a second station group associated with the directional antenna pattern;
      in accordance with a determination that at least one target client station is selected from the plurality of candidate client stations for communication, determining a target antenna pattern associated with a target station group to which the at least one target client station is assigned; and control the antenna assembly to generate the target antenna pattern for communication with the at least one target client station.

8. The AP of claim 7, wherein the at least one directional antenna pattern comprises a first directional antenna pattern providing a first radiation coverage area and a second directional antenna pattern providing a second radiation coverage area, the first radiation coverage area being partially overlapped with the second radiation coverage area, and wherein the control system is configured to assign the plurality of candidate client stations by:

in accordance with a determination that at least one of the plurality of candidate client stations is located within an overlapped area of the first and the second radiation coverage areas, assigning the at least one candidate client station to both station groups associated with the first directional antenna pattern and the second directional antenna pattern.

9. The AP of claim 8, wherein the first directional antenna pattern has peak gains at zero degree and 180 degrees in an azimuthal plane of the AP, and the second directional antenna pattern has peak gains at 90 degrees and 270 degrees in the azimuthal plane of the AP.

10. The AP of claim 7, wherein the plurality of candidate client stations are assigned to two or more of the plurality of predetermined station groups, the control system being further configured to:

determining a target station group from the two or more station groups based on two or more respective numbers of stations within the two or more station groups; and selecting at least one target client station assigned to the target station group.

11. The AP of claim 10, wherein the control system is configured to determine the target station group by:

comparing the two or more respective numbers of stations within the two or more station groups with a threshold number; and selecting a station group of the two or more station groups having the number of stations exceeding the threshold number, as the target client station.

12. The AP of claim 7, wherein the AP is configured to perform beamforming-based communication or multi-user (MU) multiple-input multiple-output (MU-MIMO) communication with the at least one target client station, and wherein the control system is configured to control the antenna assembly by:

determining whether a successful null data packet (NDP) sounding process for the at least one target client station is performed using the target antenna pattern;

in accordance with a determination that the successful NDP sounding process is performed using the target antenna pattern, controlling the antenna assembly to communicate data with the at least one target client station using the target antenna pattern; and in accordance with a determination that no successful NDP sounding process is performed with any of the at least one target client station using the target antenna pattern, controlling the antenna assembly to initiate a further NDP sound process with the at least one target client station using the target antenna pattern.

13. The AP of claim 7, wherein the antenna assembly comprises at least one antenna element and a plurality of reflectors, and wherein the control system is configured to:

in accordance with a determination that the target antenna pattern is the omnidirectional antenna pattern, cause the plurality of reflectors to be disabled; and in accordance with a determination that the target antenna pattern is a directional antenna pattern of the at least one directional antenna pattern, cause at least one of the plurality of reflectors to be disabled and the other ones of the plurality of reflectors to be enabled according to the directional antenna pattern.

14. An apparatus comprising:

at least one processor; and a memory coupled to the at least one processor, the memory storing instructions to cause the at least one processor to implement acts comprising:

determining respective locations of a plurality of candidate client stations to be communicated with an access point (AP);

assigning the plurality of candidate client stations to a plurality of predetermined station groups based on the determined respective locations, the plurality of predetermined station groups being associated with a plurality of antenna patterns of the AP, and the plurality of antenna patterns providing respective radiation coverage areas, wherein the plurality of antenna patterns comprise an omnidirectional antenna pattern and at least one directional antenna pattern;

wherein assigning the plurality of candidate client stations comprises:

assigning the plurality of candidate client stations to a first station group of the plurality of station groups associated with the omnidirectional antenna pattern; and in accordance with a determination that at least one of the plurality of candidate client stations is located within a radiation coverage area provided by one of the at least one directional antenna pattern, assigning the at least one candidate client station to a second station group associated with the directional antenna pattern;

in accordance with a determination that at least one target client station is selected from the plurality of candidate client stations for communication, determining a target antenna pattern associated with a target station group to which the at least one target client station is assigned; and causing the AP to communicate with the at least one target client station using the determined target antenna pattern.

* * * * *